United States Patent [19]

Narita

[11] Patent Number: 4,658,316
[45] Date of Patent: Apr. 14, 1987

[54] HEAD SUPPORTING STRUCTURE

[75] Inventor: Fujiaki Narita, Amagasaki, Japan

[73] Assignee: Ricoh Company, Ltd., Tokyo, Japan

[21] Appl. No.: 595,672

[22] Filed: Apr. 2, 1984

[30] Foreign Application Priority Data

Apr. 4, 1983 [JP] Japan ............................. 58-50333[U]
Apr. 19, 1983 [JP] Japan ............................. 58-5911[U]

[51] Int. Cl.$^4$ .............................................. G11B 5/56
[52] U.S. Cl. .................................................... 360/109
[58] Field of Search ................................. 360/104, 109

[56] References Cited

U.S. PATENT DOCUMENTS 4,184,183 1/1980 Dolby .............................. 360/109 X
4,507,696 3/1985 Hutter .................................. 360/109

Primary Examiner—A. J. Heinz
Attorney, Agent, or Firm—Oblon, Fisher, Spivak, McClelland & Maier

[57] ABSTRACT

A video head mounting structure utilizes a supporting plate, preferably including a bimorph cell or piezo-electric element, which is provided with a head at its free end and with a generally U-shaped groove with its open side directed to a base end which is opposite to the free end.

8 Claims, 5 Drawing Figures

HEAD SUPPORTING STRUCTURE

BACKGROUND OF THE INVENTION

1. Field of the Invention

This invention relates to a structure for supporting a head, and particularly to a head supporting structure for supporting a video head in a video tape recorder (VTR) system.

2. Description of the Prior Art

In a VTR system, a video head scans tape along a track formed thereon, and when the head deviates from the track, the head is moved with respect to the tape in the transverse direction of the track thereby bringing the head back into registry with the track, so that a so-called tracking operation is carried out. Typically, a head is mounted at a tip end of piezo-electric element which is fixedly attached to a head bar, head disc or rotating cylinder, and when a deviation of the head from a predetermined track on tape is detected, a voltage proportional to the amount of deviation is applied to the piezo-electric element thereby moving the head back into registry with the track. And, such a piezo-electric element is typically comprised of a bimorph cell which includes two piezo-electric plates overlaid opposite in polarity and sandwiched by three electrode layers with the sandwiched electrode layer connected to one terminal and the pair of sandwiching electrode layers commonly connected to the other terminal, whereby a voltage is applied between the terminals.

FIGS. 1a and 1b show a typical prior art head supporting structure in a VTR system. As shown, the supporting structure includes a rotary cylinder 4 to which one end of a piezo-electric element 1 is fixedly attached through a fixture element 3 by means of a screw 2, and a head 5 is fixedly mounted at the free end of the piezo-electric element 1. There is also provided another cylinder 6 opposite to the cylinder 4, and the head 5 is so located to slightly project toward outside with respect to the peripheral surface defined by these opposed cylinders 4 and 6. It is to be noted that since this is a two-head system, there is a pair of heads 5, 5 located diametrically opposite to each other.

In FIG. 1a, tape travels around the cylinders 4 and 6 slightly aslant and the head 5 moves along a circle. And, when a voltage is applied to the piezo-electric element 1 for tracking operation, the piezo-electric element 1 deflects either upward or downward depending on the direction of the voltage applied thereby causing the head 5 to move up and down correspondingly.

In the above-described structure, however, the amount of vertical shift of head 5 is proportional to a distance $l_1$ from the fixture point to the free end of the piezo-electric element 1 and a voltage applied to the element 1. Thus, if it is desired to make the cylinder 4 smaller in diameter, the distance $l_1$ becomes smaller and thus the shift amount of head 5 is reduced, thereby making it impossible to attain a sufficient tracking function. This has long been one of the obstacles in making the head cylinder and thus the overall VTR system compact in size.

SUMMARY OF THE INVENTION

Therefore, it is a primary object of the present invention to obviate the disadvantages of the prior art as described above and to provide an improved head supporting structure.

Another object of the present invention is to provide a head supporting structure particularly suitable for use in a VTR system.

A further object of the present invention is to provide a head supporting structure compact in size and easy to make.

A still further object of the present invention is to provide a head supporting structure capable of carrying out a tracking operation accurately and reliably at all times.

A still further object of the present invention is to provide a head supporting structure capable of adjusting the orientation of a deflectable supporting arm having a head mounted at its free end with respect to a rotary cylinder on which the supporting arm is fixedly mounted.

Other objects, advantages and novel features of the present invention will become apparent from the following detailed description of the invention when considered in conjunction with the accompanying drawings.

BRIEF DESCRIPTION OF THE DRAWINGS

FIG. 3b is a cross-sectional view of the structure shown in FIG. 3a.

DESCRIPTION OF THE PREFERRED EMBODIMENTS

Figure 1A:
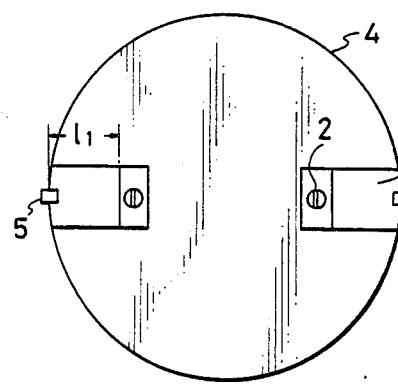
FIGS. 1a and 1b are schematic illustrations showing a typical prior art rotary head assembly for use in a VTR system.
Figure 1B:
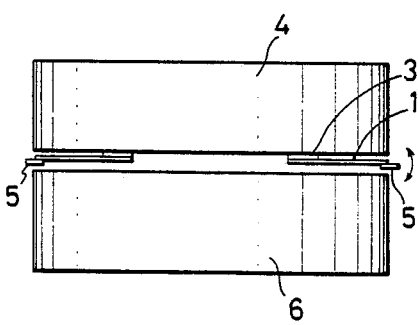
Figure 2:
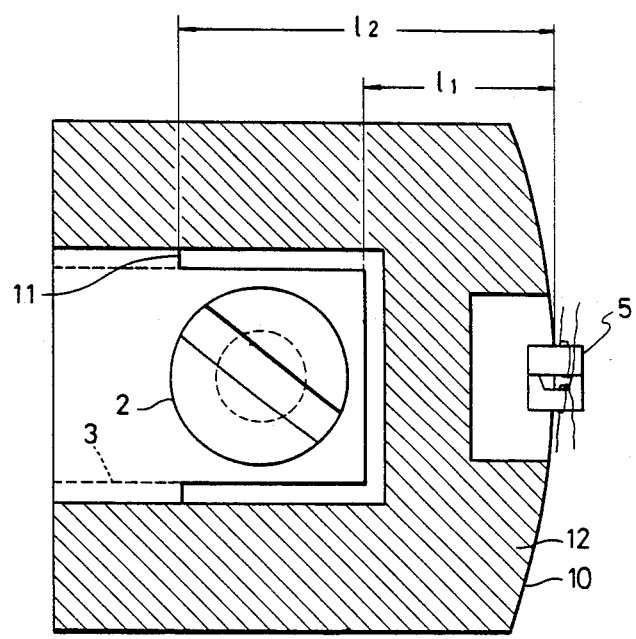
FIG. 2 is a plan view showing a head supporting structure constructed in accordance with one embodiment of the present invention.

Referring now to FIG. 2, there is shown a head supporting structure constructed in accordance with one embodiment of the present invention. As shown, the head supporting structure includes a deflectable supporting plate 10 which is comprised of a piezo-electric element 10 in the illustrated example. The supporting plate 10 is generally rectangular, substantially square in the illustrated example, in shape and supports a head 5 at its free end as fixedly mounted thereon. The supporting plate 10 is provided with a generally U-shaped groove, gap or slot 11 with its open side directed to a base end which is opposite to the free end at which the head 5 is mounted. That portion of the supporting plate 10 which is circumscribed by the U-shaped gap 11 is defined as a mounting portion which is fixedly attached to a rotary cylinder, head bar or head disc through a fixture plate 3 by means of a screw 2. The fixture plate 3 in the illustrated example is as wide as the U-shaped mounting portion and extends from the bottom of the U-shaped gap 11 to the base end of the supporting plate 10. It is to be noted that the supporting plate 10 may be a separate plate which is fixedly attached to the rotary cylinder 4 or a projection integrally formed on the cylinder 4. The supporting plate or piezo-electric element 10 is preferably comprised of a bimorph cell, in which case electrodes are formed in a shaded region 12 and thus no electrode is formed in those regions immediately adjacent to the head 5 and to the mounting portion which comes into contact with the fixture plate 3.

With the above-described structure, when a voltage is applied to the electrode 12, the supporting plate 10 deflects upward or downward depending upon the polarity of the applied voltage with the base end as a pivotal point so that the head 5 may be moved in the transverse direction of a track on tape ( not shown ). In the illustrated embodiment, the length of a deflecting portion of the supporting plate 10 is $l_2$ which is much larger than the length $l_1$ of a corresponding deflecting portion of the prior art structure.

As described above, in accordance with the above-described embodiment, since the U-shaped gap 11 is provided in the supporting plate 10 such that it circumscribes the mounting portion which is affixed to the fixture plate 3 by means of the screw 2, a long deflecting portion may be defined in the plate 10 even if the plate 10 itself is made smaller in size. Thus, such a structure can satisfy seemingly contradictory requirements of miniaturization and large head shift. Thus, the present invention allows to make the overall structure smaller in size and to carry out a tracking operation satisfactorily. It is to be noted that the U-shaped gap 11 does not need to be U-shaped and it may take any other shape, such as an arc-shape and a circular shape. Thus, criticality in the gap 11 is not U-shaped, but it is provided to circumscribe the mounting portion of the supporting plate 10 to define a pivotal point or line at a location closer to the base end of the plate 10.

Figure 3A:
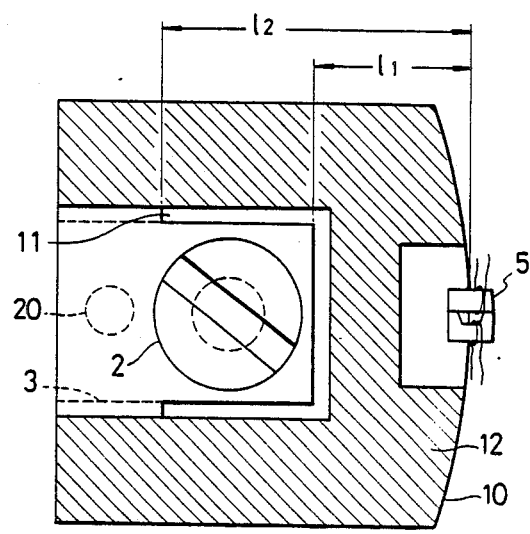
FIG. 3a is a plan view showing a head supporting structure constructed in accordance with another embodiment of the present invention.
Figure 3B:
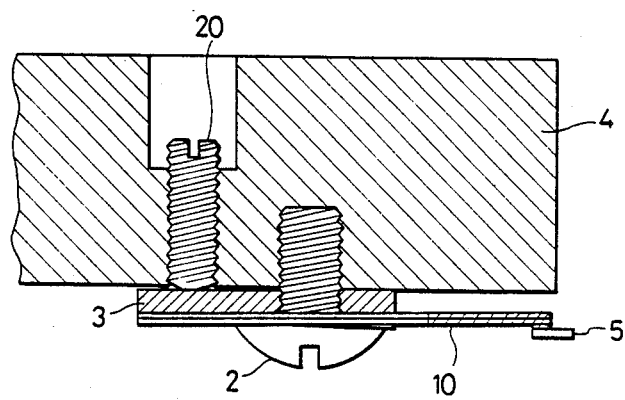

FIGS. 3a and 3b show another embodiment of the present invention, which is in many respects similar to the above-described embodiment and thus like numerals are used to indicate like elements. In this embodiment, the fixture plate 3 is a separate plate to which the mounting portion of the supporting plate 10 is fixedly attached by means of the mounting screw 2. Also provided in this embodiment is an adjusting screw 20 as screwed into a threaded hole 4a provided in the rotary cylinder 4. A counter-bore 4b is provided at the top side of the rotary cylinder 4 so that the adjusting screw 4a may be screwed in either direction to have it projected or retracted.

In such a structure, when the head 4 is to be centered, the adjusting screw 20 may be screwed in a desired direction to pivotally move the supporting plate 10 with the mounting screw as a pivot.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A structure for movably mounting a head, comprising:

a base;

a generally elongated, planar supporting plate (10) including a first end at which said head (5) is fixedly attached, a second end at an opposite end of said plate (10), and an intermediate mounting portion located between said first and second ends, wherein said mounting portion comprises a tab which projects from said second end toward said first end and which is circumscribed by a generally U-shaped gap (11) formed between a portion of said supporting plate and said tab such that said head (5) is cantilevered on said first end by a longer distance measured from said head to said second end than a distance from the head to said mounting portion; and means (2) for fixedly attaching said mounting portion to said base.

2. The structure of claim 1 wherein said base is a rotary cylinder of a VTR system.

3. The structure of claim 2 further comprising a fixture plate provided as inserted between said rotary cylinder and said mounting portion of said supporting plate.

4. The structure of claim 3 wherein said fixture plate is a separate plate fixedly attached to said mounting portion of said supporting plate.

5. The structure of claim 4 further comprising adjusting means for adjusting the orientation of said supporting plate with respect to said base.

6. The structure of claim 5 wherein said adjusting means includes a screw screwed in a threaded hole provided in said base, said screw being engageable with said fixture plate at a point between said second end and said fixedly attaching means.

7. The structure of claim 3 wherein said fixture plate is a projection formed integrally with said rotary cylinder.

8. The structure of claim 1 wherein said supporting plate is a bimorph plate.

* * * * *